United States Patent Office 3,824,081
Patented July 16, 1974

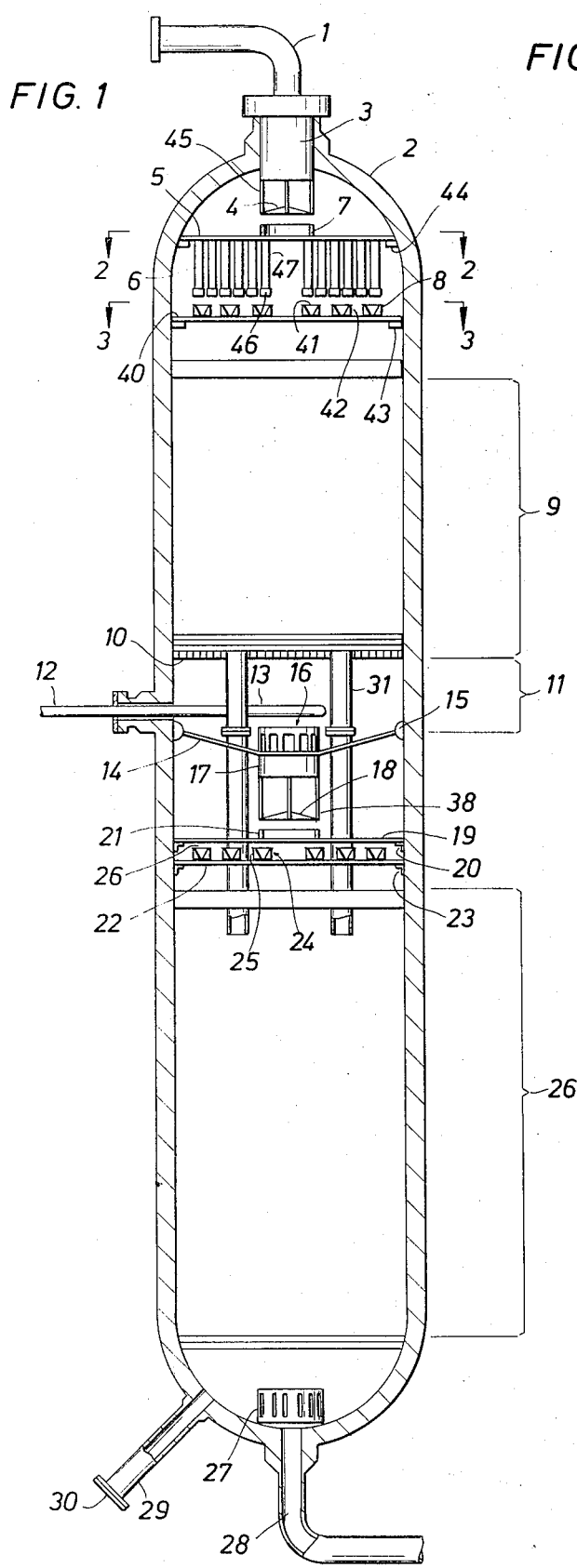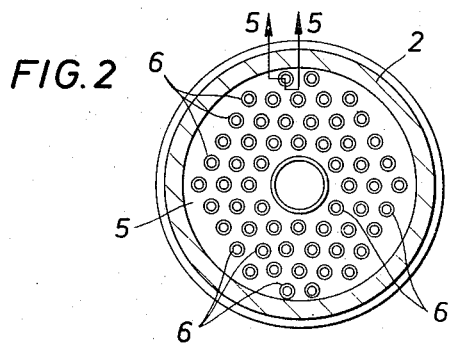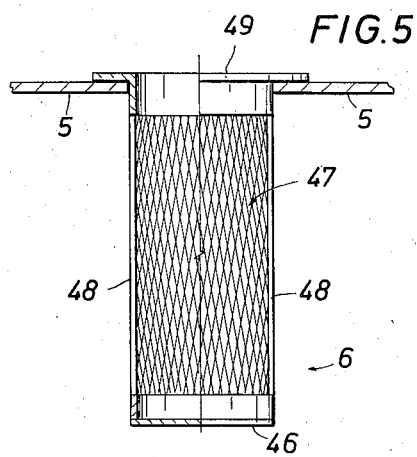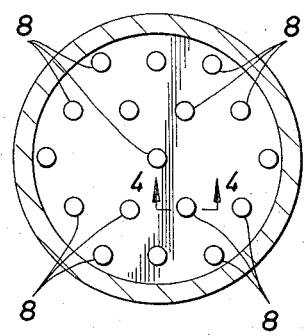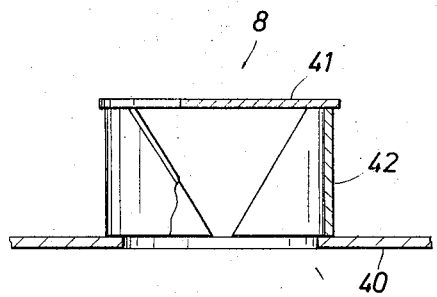

3,824,081
VERTICAL REACTOR FOR TWO-PHASE VAPOR-LIQUID REACTION CHARGE
Randlow Smith, John C. Strickland, John W. Sanwald, and Henry B. Jones, Houston, Tex., assignors to Texaco, Inc., New York, N.Y.
Filed Apr. 27, 1972, Ser. No. 248,280
Int. Cl. B01j 9/04
U.S. Cl. 23—288 R                    5 Claims

ABSTRACT OF THE DISCLOSURE

A vertical downflow reactor for contacting a two-phase, vapor-liquid reaction mixture with solid catalyst contained in one or more reactor vessel catalyst zones. Means are provided in the upper portion of such vertical reactor to separate any solid particulate contaminants from said reaction mixture prior to admitting the reaction mixture into a reactor vessel catalyst zone. Means are also provided for evenly distributing vapor and liquid components of the reaction charge mixture across the horizontal cross-sectional area of a reactor vessel catalyst zone.

---

This application is related to U.S. Patent Application Ser. No. 248,281, filed Apr. 27, 1972.

BACKGROUND OF THE INVENTION

The present invention relates to a vertical reactor for contacting a two-phase vapor-liquid reaction mixture with solid catalyst contained in two or more reactor vessel catalyst zones, wherein the reaction mixture flows downward. More particularly, the present invention relates to novel reactor internal parts located above an upper catalyst zone in a reaction vessel. Such reactor internal parts provide means for removing solid particulate contaminants from liquid reaction charge material and even redistribution of liquid and vapor reaction charge components across the top horizontal cross-section of said upper catalyst zone.

Many vertical, downflow reactors are available for contacting a vapor-liquid reaction mixture with a solid catalyst. In many processes, reactions are exothermic and release substantial amounts of heat. Commonly such reactors for exothermic reactions are designed with a plurality of catalyst zones, each containing solid catalyst, in vertical alignment one with the other. For such exothermic reactions, it is known to install quench means between catalyst zones such that a quench fluid may be injected into the reactor vessel wherein it mixes with a vapor-liquid reaction effluent from one catalyst zone to absorb excess heat therefrom before such vapor-liquid reaction mixture enters a succeeding catalyst zone.

In such an exothermic catalytic process, quench fluid commonly comprises a vapor component of the reaction mixture. Such quench fluid, at a relatively low temperature, is injected into a reactor vessel wherein the fluid mixes with hot vapor-liquid reaction mixture to reduce the temperature of such reaction mixture. In addition, when the quench fluid comprises a vapor component of the reaction mixture, the quench fluid replaces a portion of the vapor reactant consumed in the preceding catalyst zone. By means of the quench fluid, a selected ratio of vapor to liquid reactants may be maintained in the reactor vessel as well as controlling the reaction temperature.

Quench fluids may be selected from such fluids as inert gases, liquids which are unreactive under the reaction conditions, and liquid components of the reaction mixture. Most commonly, however, the quench fluid is selected from a vapor component of the reaction mixture, as described above.

Such vertical downflow reactors to which the present invention relates, find application in a variety of continuous processes wherein a vapor-liquid reaction mixture is contacted with a solid catalyst. Particularly, such reactors are useful in processes wherein petroleum oils are reacted in the presence of hydrogen, such as hydrotreating processes for conversion of sulfur and nitrogen components of petroleum oils and hydrocracking processes for conversion of relatively high molecular weight hydrocarbons into lower molecular weight hydrocarbons. Such reactions of petroleum oils with hydrogen are referred to herein as hydrotreating reactions, and such term is intended to include both hydrogen treating for removal of impurities and hydrocracking for reduction of molecular weight. In hydrotreating heavy oils such as reduced crudes, residual oils, and vacuum gas oils, vertical downflow reactors having a plurality of catalyst zones are commonly employed. As such hydrotreating reactions are exothermic, it is common practice to inject a hydrogen quench stream into a quench zone between succeeding catalyst zones. The hydrogen quench stream absorbs heat from the reaction mixture thereby controlling the reaction temperature within a desired range. Additionally the quench stream maintains the ratio of hydrogen to hydrocarbon at a desirably high value. Heavy oils, when treated at elevated temperatures, have a tendency to thermally crack, forming high molecular weight carbonaceous materials and solid coke. Such thermal cracking is in some degree time dependent. Consequently, it is desirable, within a reactor for treating heavy oils, that no area be available where liquid may stand stagnant for extended time periods at elevated temperatures. Areas of hot, stagnant liquid, in addition to undergoing additional thermal cracking with time, also provide areas for carbonaceous deposits to accumulate. Such accumulations of carbonaceous deposits may interfere with flow of reactants through the reactor, and under severe conditions may plug the reactor, preventing all flow therethrough. In addition to thermal cracking, heavy oils tend to crack in the presence of hydrotreating catalyst and under appropriate conditions will form substantial amounts of high molecular weight carbonaceous materials and solid coke. Carbonaceous materials from both thermal cracking and from cracking in the presence of catalysts may accumulate upon the hydrotreating catalyst. Such accumulation of carbonaceous materials reduce catalytic activity of the hydrotreating catalysts. Hydrogen, particularly in the presence of hydrotreating catalyst, reacts with cracked hydrocarbons to form stable compounds and reduce the production of high molecular weight carbonaceous materials. Consequently, a relatively large amount of hydrogen in intimate contact with heavy oil reactants is desirable in a reactor for hydrotreating heavy oils.

Reactants are charged to a reaction zone in many conversion processes as a two-phase, vapor-liquid mixture. It is often necessary to heat the reaction charge mixture to an elevated temperature sufficient to initiate the desired conversion reaction. The reaction charge mixture, particularly in the case where at least one reaction charge component is a petroleum fraction, may contain solid particulate contaminants. Such solid particulate contaminants, if allowed to contact solid catalyst particles contained within a bed in a reaction vessel tend to accumulate upon the upper surface of or within the bed of such solid catalyst particles. The accumulation of such solid contaminants within a reactor vessel restricts the area available for flow of reactants which increases the pressure requirements necessary to force reactants through the catalyst bed. Under severe conditions, solid impurities may close substantially all the free area available for flow of reactants, thereby plugging the catalyst bed.

When pressure requirements for passing a reaction charge mixture through a reaction vessel become too great, or when reaction charge flow is substantially prevented by a catalyst bed plugged with solid contaminants, it becomes necessary to shut down the conversion process and regenerate that catalyst to remove such accumulated solid contaminants. Petroleum conversion processes, wherein a reaction charge comprises a relatively heavy petroleum oil and wherein elevated reaction charge temperatures are employed, tend to result in the presence of substantial amounts of solid particulate contaminants within the reaction charge mixture. Such relatively heavy petroleum oils, upon heating, tend to thermally crack and/or condense to form small amounts of solid coke and other solid or semi-solid high molecular weight carbonaceous materials. Additionally, where a reaction charge mixture comprises a petroleum fraction containing sulfur or sulfur compounds, solid metallic sulfides, such as iron sulfide, are often formed in a heating step preceding the introduction of the reaction charge mixture into the reaction mixture. Such solid metallic sulfides if allowed to contact a catalyst bed tend to accumulate therein resulting in high pressure drop through the catalyst bed or plugging of the catalyst bed.

Prior art methods for preventing the accumulation of solid contaminants from a reaction charge mixture in a catalyst bed are known. For instance see U.S. Pat. 3,112,256.

SUMMARY OF THE INVENTION

Now according to the present invention, a novel reactor internal configuration is disclosed for a vertical, downflow reactor comprising a reactor vessel having one or more catalyst zones. Such a novel reactor internal configuration comprises means for introducing a vapor-liquid mixed phase reactor charge into the reactor vessel, separating any entrained solid contaminants from the liquid portion of the reaction charge and evenly distributing vapor and liquid reactor charge across the horizontal cross-sectional area of a succeeding reactor catalyst zone.

Said reactor internal configuration is in vertical communication with the reaction charge inlet to a reactor vessel and the top of a catalyst zone. In a preferred embodiment, said reactor internal configuration comprises: A horizontally disposed dispersing means comprising a splash plate spaced below and axially aligned with a downwardly opening reaction charge nozzle: a horizontal basket support tray spaced below said splash plate, wherein the periphery of the basket support tray contacts the wall of the reactor vessel, such basket support tray having a plurality of openings for receiving foraminous baskets (hereinafter further described) and having a vapor opening concentric with the vertical axis of the reactor vessel. Further, the splash plate is so disposed that liquid, entering the reactor vessel via the inlet nozzle, cannot directly enter the vapor opening; a cylindrical weir, upon the basket support tray, surrounding the vapor opening to prevent liquid flow from the upper surface of said basket support tray through said vapor opening; a plurality of foraminous baskets for collecting solid contaminants from the liquid component of the reaction charge, said baskets comprising hollow cylinders of wire mesh closed at the bottom and open at the top disposed such that a basket extends through each opening provided therefor in the basket support tray in a manner wherein the top of each basket is substantially even with the top of said basket support tray and wherein the major portion of each basket extends below said basket support tray; a distribution means, attached to said reactor vessel below said basket support tray, comprising a distributor tray having a plurality of evenly spaced openings; and a plurality of distributor caps upon the distributor tray covering all the distributor tray openings, for evenly distributing vapor and liquid across the horizontal cross-section of a reactor vessel catalyst zone.

The reactor internal parts of the present invention provide an efficient means for removing solid contaminants from a reaction charge mixture which otherwise would collect in a succeeding bed of catalyst thereby creating increased pressure drop through the reactor or plugging the reactor. Vapor and liquid components of the reaction mixture, after removal of solid contaminants are evenly redistributed across the horizontal cross-section of a succeeding catalyst zone. Such reactor internal parts have no "dead zones" for the accumulation of stagnant liquid. As only the liquid components of the reaction charge passes through the foraminous baskets, pressure drop through the reactor internals of the present disclosure is moderate. Even though the foraminous baskets should become filled with solid contaminants flow through the reactor vessel is not hindered as flow may continue through the vapor opening in the basket support tray. Thus, upon a large accumulation of solids in said baskets, flow of reaction charge may be continued by allowing liquid to overflow the cylindrical weir, thereby allowing time to proceed with an orderly shut down of the process. Also, flow of regeneration gases through the reactor vessel may be maintained at less pressure drop although the baskets are full of solids, by the flow of such regeneration gases through the vapor opening in the basket support tray.

BRIEF DESCRIPTION OF THE DRAWINGS

FIG. 1 of the attached drawings is a schematic diagram, in section, of a reactor employing the reactor internal configuration of the present invention.

FIG. 2 of the drawings is a sectional view at 2—2 on FIG. 1.

FIG. 3 of the drawings is a sectional view at 3—3 on FIG. 1.

FIG. 4 of the drawings is a sectional view at 4—4 on FIG. 3.

FIG. 5 of the drawings is a sectional view at 5—5 on FIG. 2.

DETAILED DESCRIPTION OF THE INVENTION

Following is a description of the invention with reference to the appended drawings which show one embodiment of the present invention. The invention disclosed herein, the scope of which being defined in the appended claims, is not limited in its application to the details of construction and arrangement of parts shown and described, since the invention is capable of other embodiments. Obvious variations and modifications of the present iaveotiot which are within the spirit and scope of the appended claims are considered to be incorporated herein. Also, it is to be understood that the phraseology and terminology employed herein is for the purpose of description and not of limitation.

FIG. 1 of the drawings is a schematic diagram in sectional view of a vertical, downflow reactor, comprising a reactor vessel 2 having two catalyst zones 9 and 26 and a quench zone 11 therebetween for containing a vapor-liquid reaction mixture for reaction in the presence of solid catalyst, which reactor contains the improved reactor internal configuration of the present invention. In FIG. 1 a vapor-liquid mixed phase reaction charge mixture from line 1 enters the top of reactor vessel 2 through inlet nozzle 3. Inlet nozzle 3 comprises a hollow cylindrical member open at both ends which is removably disposed within an opening through the wall of reactor 2 and concentric with the vertical axis of reactor vessel 2. The vapor-liquid charge mixture passing through inlet nozzle 3 strikes a horizontal splash plate 4 such that the liquid component is distributed across the horizontal cross-section of reactor vessel 2. Distributor plate 4 is located at a distance spaced below and concentric with inlet nozzle 3 and has a shape effective for dispersing liquid phase impinging thereon. Preferably, splash plate 4 comprises a cone with upward facing apex, said cone having substantially same radius as inlet nozzle 3. Splash plate 4 is maintained in its spaced, concentric relationship to inlet nozzle 3 by a plurality of connecting members 45. Liquid phase and vapor phase materials exit inlet nozzle 3 through the space between inlet nozzle 3 and splash plate 4.

At a distance spaced below splash plate 4, FIG. 1, basket support tray 5 spans a horizontal cross-sectional area of reactor vessel 2. The outer periphery of basket support tray 5 is attached to the inner wall of reactor vessel 2 by attachment means 44, forming a vapor tight connection. Basket support tray 5 comprises a circular tray having a major vapor opening concentric with the vertical axis of reactor vessel 2. Preferably the vapor opening is of about the same radius as splash plate 4. Basket support tray 5 also has a plurality of evenly spaced basket openings. The concentric opening in basket support tray 5 is of a size sufficient to allow passage of reactor charge vapors therethrough at a pressure drop not exceeding about 5 inches of water. A cylindrically shaped weir 7 is mounted on the upper surface of tray 5 to surround the vapor opening therein in such a manner as to prevent the liquid from flowing into the vapor opening. Preferably, the cylindrical weir 7 has a height in the range of about 3–5 inches. The top of concentric weir 7 is vertically spaced below the bottom of distributor plate 4 by an amount sufficient to allow passage of reactor charge vapors therebetween with substantially no pressure drop. The evenly spaced basket openings in basket support tray 5 are of a size sufficient to receive baskets 6. Conveniently, such perforations may be in the range of about 4 inches diameter to about 8 inches diameter for receiving baskets 6 of similar diameters.

The baskets 6, FIG. 1, are provided to accumulate solid particles which may enter reactor vessel 2 with a reaction charge mixture, thereby preventing such solid particles from entering first catalyst zone 9 wherein such solids, under operating conditions, would plug a catalyst bed in catalyst zone 9. Each basket 6, shown in more detail in FIG. 5, comprises a hollow cylindrical foraminous member 47, a bottom closure member 46 and a top member 49. Preferably, the foraminous member 47 is made of wire mesh. The closure member 46 closes the bottom end of foraminous member 47 such that solid particles entering the open top of foraminous member 47 may not be discharged from the bottom thereof. The foraminous members 47 of the baskets 6 extend vertically through basket openings in basket support tray 5 in such manner that the open tops of the hollow foraminous members 47 are substantially even with the top of support tray 5.

The liquid component of reaction charge mixture entering reactor vessel 2, FIG. 1, via nozzle 3 impinges upon splash plate 4 from which it falls upon the surface of basket support tray 5. The vapor component of the reaction charge mixture enters reaction vessel 2 through the space between inlet nozzle 3 and splash plate 4. Any solid contaminants entering reactor vessel 2 with the reaction charge mixture falls from splash plate 4 onto basket tray 5 along with the liquid component of said reaction charge mixture. The liquid component, solid contaminants, and a minor portion of the vapor component, pass from the upper surface of basket support tray 5 into baskets 6. The vapor and liquid contents of baskets 6 pass through the foraminous walls of members 47 and solid contaminants, which do not pass through the foraminous walls, are accumulated within hollow baskets 6. Thus, solid contaminants entering reactor vessel 2 with a reaction charge mixture are prevented from coming in contact with a bed of solid catalyst contained in catalyst zone 9. A major portion of the vapor component of the reaction charge mixture passes from above basket support tray 5 through the concentric vapor opening therein. Cylindrical weir 7 prevents liquid from the surface of basket support tray 5 from entering the concentric vapor opening and thereby by-passing baskets 6.

Liquid component from baskets 6, FIG. 1, collects upon reactor charge distributor tray 40 which is vertically spaced below the bottom of baskets 6. Reactor charge distributor tray 40, as shown in greater detail in FIGS. 3 and 4, comprises a horizontal plate peripherally attached to the inner wall of reactor vessel 2 by attachment means 43, forming a vapor tight connection. Reactor charge distributor tray 40 has a plurality of evenly spaced openings. Upon the surface of reactor charge distributor tray 40 and covering each opening are a plurality of distributor caps 8. Each distributor cap 8 comprises a vertically disposed hollow cylindrical member 42 open at the bottom into an opening in distributor tray 40 and closed at the top by a plate member 41. Each cylindrical member 42 of distributor cap 8 has at least one V-notched opening with an apex near the upper surface of distributor tray 40 and a base at or near the upper end of cylindrical member 8.

Liquid from baskets 6, FIG. 1, collects upon the upper surface of reactor charge distributor tray 40 from which said liquid flows through the V-notched opening in distributor cap 8. Vapor from above basket support tray 5 flows through the vapor opening in backet support tray 5 and flows through the V-notched openings in distributor cap 8 along with the liquid. The total free area defined by openings in reactor charge distributor tray 40 and the area defined by the V-notched openings in distributor cap 8 are sufficient to allow flow of reaction charge liquid and vapor phases at a pressure drop not exceeding about 10 inches of water. The vapor and liquid components of the reaction charge mixture flow through distributor tray 40 such that the vapor and liquid are evenly distributed across the horizontal cross-sectional area of first catalyst zone 9, FIG. 1.

First catalyst zone 9 is an upper portion of reactor vessel 2 for holding a bed of solid, particulate catalyst. During operation of a process employing the reactor described herein, a vapor-liquid reaction mixture flows through first catalyst zone 9 intimately contacting solid catalyst, wherein the reaction mixture is at least partially reacted to form desired reaction products.

A reaction mixture comprising vapor and liquid phases passes from first catalyst zone 9 in FIG. 1 through catalyst support means 10 into quench zone 11. Such reaction mixture may be at an elevated temperature from the adsorption of heat of reaction evolved in first catalyst zone 9. Also, the reaction mixture is depleted in one or more reactant components and contains a substantial proportion of reaction products. A quench fluid from line 12 enters quench zone 11 through quench nozzle 13 for admixture with the reaction mixture present in quench zone 11. Such quench fluid, at a low temperature mixes with first catalyst zone effluent, which is at an elevated temperature, to form a new mixture which is at an intermediate temperature suitable for admission into a second catalyst zone 26 wherein additional reactions take place. Quench fluid may be selected from either vapor or liquid materials and may comprise a fluid substantially inert under the reaction conditions within reactor vessel 2 or may comprise one or more of the reactant components of the reaction mixture. Preferably, quench fluid is selected from a vapor component of the reaction charge mixture. For example, in hydrotreating reactions, hydrogen gas is a preferred quench fluid because, in addition to reducing the temperature of reaction mixture effluent from the first catalyst zone 9, such hydrogen gas replaces hydrogen reactant consumed in the hydrotreating reaction.

Collector tray 14, FIG. 1, receives liquid phase components of the reaction mixture leaving quench zone 11. Such collector tray 14 comprises an inwardly sloping tray, the outer periphery of which is attached to the inner wall of reactor vessel 2 by attachment means 15. Collector tray 14 slopes inwardly and downwardly from its periphery towards the center of reactor vessel 2, and has a circular opening concentric with the vertical axis of reactor vessel 2. The inward slope of collector tray 14 is sufficient for ready liquid flow down the upper surface of tray 14 toward the centrally located opening. Slopes having a drop to run ratio of from about 1:4 to about 1:16 are effective to allow ready flow of liquid down the surface of collector tray 14.

Liquid flowing down collector tray 14, FIG. 1, and vapor from quench zone 11 enters mixing means 16 wherein vapor phase and liquid phase are brought into intimate contact to ensure good heat transfer between the phases. Mixing means 16 is located upon the upper surface of collector tray 14 and is concentric with the vertical center line of reactor vessel 2, covering the opening in collector zone 14.

Vapor and liquid phases from mixing means 16, FIG. 1, pass through the opening in collector tray 14 into mixer downcomer 17. Liquid phase from mixer downcomer 17 passes downward, striking distributor plate 18 in such a manner that the liquid phase is distributed across the horizontal cross-section of reactor vessel 2. Distributor plate 18 is located at a distance spaced below and concentric with mixer downcomer 17 and has a shape effective for dispersing liquid phase impinging thereon. Preferably, distributor plate 18 comprises a cone with upward facing apex, said cone having substantially the same radius as mixer downcomer 17. Distributor plate 18 is maintained in its spaced, concentric relationship to mixer downcomer 17 by a plurality of connecting members 38. Liquid phase and vapor phase materials exit mixer downcomer 17 through the space between mixer downcomer 17 and distributor plate 18.

At a distance spaced below distributor plate 18, FIG. 1, perforated tray 19 spans a horizontal cross-sectional area of reactor vessel 2. The outer periphery of perforated tray 19 is attached to the inner wall of reactor vessel 2 by attachment means 20, forming a vapor tight connection. Perforated tray 19 comprises a circular tray having a major opening concentric with the vertical axis of reactor vessel 2 of about the same radius as distributor plate 18 and having a plurality of evenly spaced minor perforations. The concentric opening in perforated tray 19 is of a size sufficient to allow passage of vapor phase therethrough at a pressure drop not exceeding about 5 inches of water. A cylindrically shaped weir 21 is mounted on tray 19 to surround the concentric hole therein in such a manner as to prevent liquid from flowing into the concentric opening. Preferably, the concentric weir has a height of about 3–5 inches. The top of concentric weir 21 is vertically spaced below the bottom of distributor plate 18 by an amount sufficient to allow passage of vapor therebetween with substantially no pressure drop. The evenly spaced perforations in perforated tray 19 are relatively small, and each of such perforations is of substantially the same diameter. Conveniently such perforations may be in the range of about 2 inches diameter to about 6 inches diameter. The total free area through perforated tray 19, defined by the total area of such minor perforations is sufficient to allow passage of liquid phase accumulated on the upper surface of perforated tray 19 at a pressure drop not exceeding about 2 inches of water and not less than about 0.1 inches of water. Liquid phase from mixer downcomer 17 after impinging upon distributor plate 18 is distributed upon the upper surface of perforated tray 19. Such liquid phase distributes evenly upon the upper surface of tray 19 and flows through the evenly distributed perforations in such a manner that liquid flow through perforated tray 19 is substantially evenly distributed across the horizontal cross-sectional area of reactor vessel 2. Vapor phase from mixer downcomer 17 passes through the concentric opening in perforated tray 19. Cylindrical weir 21 prevents liquid upon the surface of perforated tray 19 from flowing through the concentric opening therein. Liquid phase from perforated tray 19 collects upon distributor tray 22 which is vertically spaced below perforated tray 19. Distributor tray 22 comprises a horizontal plate peripherally attached to the inner wall of reactor vessel 2 by attachment means 23, forming a vapor tight connection. Distributor tray 22 has a plurality of evenly spaced openings. Upon the surface of distributor tray 22 and covering each opening are a plurality of distributor caps 24. Each distributor cap 24, comprises a vertically disposed hollow cylindrical member open at the bottom into an opening in distributor tray 22 and closed at the top by a plate member 26. Each cylindrical 25 of distributor cap 24 has at least 1 V-notched opening with an apex near the upper surface of distributor tray 22 and a base at or near the upper and of cylindrical member 25.

Liquid from perforated tray 19, FIG. 1, collects upon the upper surface of distributor tray 22 from which said liquid flows through the V-notched opening in distributor caps 24. Vapor from above perforated tray 19 flows through tray 19 and flows through the V-notched openings in distributor caps 24 along with the liquid. The total free area defined by openings in distributor tray 22 and the area defined by the V-notched openings in distributor cap 24 are sufficient to allow flow of liquid and vapor phase at a pressure drop not exceeding about 10 inches of water.

Vapor phase and liquid phase flowing through openings in distributor tray 22, FIG. 1, are substantially evenly distributed across the horizontal cross-section of a second catalyst zone 26 of reactor vessel 2. The vapor phase and liquid phase components of the reaction mixture pass downward through second catalyst zone 26 wherein reactants may undergo additional reaction in the presence of solid particulate catalysts to form additional amounts of desired reaction product. From second reaction zone 26 a second reaction effluent comprising a vapor phase and a liquid phase enters outlet cap 27. From outlet cap 27 reaction effluent exists reactor vessel 2 via line 28.

In the operation of a commercial process wherein a solid catalyst is employed to catalyze a desired reaction, such catalyst eventually loses its catalytic activity and must be replaced. Two common means are employed for removing spent catalyst which has lost its catalytic activity from a reactor vessel. One means is to employ a vacuum system wherein catalyst is removed from the top of the reactor vessel 2, FIG. 1, through a suction hose. Preferably however, catalyst is removed from reactor vessel 2 by draining from the bottom under the influence of gravity. A nozzle 29 is provided near the bottom of reactor vessel 2 for draining reactor vessel 2. Catalyst contained in second catalyst zone 26 is in open communication with catalyst drain nozzle 29 and may easily be removed from reactor vessel 2 simply by removing blind flange 30 from catalyst drain nozzle 29 and allowing the catalyst to flow under the influence of gravity from reactor vessel 2.

Catalyst support means 10, FIG. 1, quench zone 11, collector tray 14, perforated tray 19, and distributor tray 22, effectively isolate first catalyst zone 9 from second catalyst zone 26 and catalyst discharge nozzle 29. Therefore to allow removal of catalyst from first catalyst zone 9 through catalyst discharge nozzle 29, a plurality of catalyst drain tubes 31 are provided. Catalyst drain tubes 31 extend upward through catalyst support grating 10 into first catalyst zone 9 and downward into the upper portion of second catalyst zone 26 in such manner that, as catalyst from second catalyst zone 26 is removed, catalysts from first catalyst zone 9 may drain into the second catalyst zone 26 and subsequently be removed from reactor vessel 2 via catalyst discharge nozzle 29. Catalyst drain tubes 31 pass through collector tray 14, perforated tray 19, and distributor tray 22 via openings provided therefor.

The above description is of a reactor having a reactor vessel 2, FIG. 1, comprising two catalyst zones 9 and 26 with one intervening quench zone 9 wherein mixing and redistributing means which are the subject of the present invention are employed. It is to be understood that a plurality of catalyst zones and two or more quench zones may be employed in reactor vessel 2 and that two or more novel mixing and redistributing means disclosed herein may be employed between succeeding catalyst zones.

FIG. 2 of the drawings is a section 2—2 of FIG. 1 showing basket support tray 5 with baskets 6 and concentric cylindrical weir 7, Section 5—5 is through one of the baskets 6.

FIG. 3 of the drawings is a section 3—3 of FIG. 1 showing reaction charge distributor tray 40 and distributor caps 8. Section line 4—4 is through one of the distributor caps 8.

FIG. 4 of the drawings shows section 4—4 of FIG. 3. In FIG. 4 of the drawings, reaction distributor tray 40 comprising a horizontal plate having a circular opening, supports distributor cap 8. Distributor cap 8 encompasses the opening in tray 40. Distributor cap 8 comprises a hollow cylinder 42 open at the bottom and closed at the top by flat circular plate 41. Hollow cylinder 42 encompasses and is concentric with the circular hole in tray 40. Cylinder 42 is attached to the upper surface of tray 40, by attachment means such as welding, to maintain the concentric relationship between cylinder 42 and the opening in tray 40. Flat circular plate 41 is attached to the upper edge of cylinder 42, by attachment means such as welding. Cylinder 42 has at least one "V"-shaped notch. Preferably, the notch is in the form of a truncated "V." The small end of said V-shaped notch is located at the bottom edge of cylinder 42 and the notch extends upward to the top edge of cylinder 42.

The spacial relationship of distributor cap 8 in FIG. 4 to reaction charge distributor tray 40 is such that liquid accumulation upon the surface of tray 40 and vapor from above tray 40 flow through the V-shaped notch in cylindrical member 42 and pass downward through the opening in tray 40.

Distributor cap 8 as shown in FIG. 4 is typical of all the distributor caps 8 which cover the evenly spaced openings in tray 40. Vapor and liquid from the upper surface of tray 40 flow through the V-notches in distributor caps 8 and the openings in tray 40 in an even flow distribution pattern across the horizontal cross-section of first catalyst zone 9, as shown in FIG. 1.

FIG. 5 of the drawings shows section 5—5 of FIG. 2. In FIG. 5 of the drawings, basket support tray 5, comprising a horizontal plate having a circular opening supports basket 6. Basket 6 extends through the opening in tray 5 such that the top of basket 6 is about even with the top surface of tray 5 and the major portion of basket 6 extends below tray 5. Basket 6 comprises a hollow cylindrical member 47 constructed of a wire mesh or other foraminous material suitable for accumulating substantially all solid particles entering basket 6 while simultaneously allowing passage of liquid and vapor through the foraminous walls. Cylindrical member 47 is attached, by attachment means such as welding, at the top to the body of circular flange member 49. The connection of cylinder 47 to the body of flange 49 aids in maintaining the cylindrical shape of cylinder 47. The body of flange 49 extends through the basket opening in basket support tray 5 in a manner such that the lip of flange 49 rests upon the upper surface of basket support tray 5 thereby supporting basket 6. The bottom of cylinder 47 is connected to a cylindrical, cup shaped bottom member 46 by connecting means such as welding. Such connection of cylinder 47 and bottom member 46 aids in maintaining the cylindrical shape of cylinder 47 and provides a bottom closure for cylinder 47 which allows accumulation of solid particles within basket 6. Additional support members 48 attached at the lower end to bottom member 46 and the upper end to flange 49 as well as being attached along their length to cylinder 47 may be provided to aid in maintaining the cylindrical shape of the foraminous material of cylinder 47.

While only one embodiment of the invention has been shown in the attached drawings and described above, it will be evident to those skilled in the art that modifications and variations are possible in the arrangement and construction of the reactor internals described without departing from the spirit and scope of the invention as set out in the appended claims.

We claim:

1. In a downflow reactor comprising a vertical vessel having a top inlet, a catalyst zone and a bottom outlet wherein vapor and liquid components of a reaction charge mixture are evenly distributed across the horizontal cross-section of the catalyst zone; an improved reaction charge flow distribution means comprising:
   (a) a cylindrical inlet nozzle concentric with the vertical axis of said reactor vessel and extending through the vessel inlet for conveying a two-phase, vapor-liquid reaction charge mixture into said reactor vessel;
   (b) a splash plate spaced below and in vertical, concentric alignment with said inlet nozzle for distributing the liquid portion of the reaction charge mixture from said inlet nozzle across the horizontal cross-sectional area of said reactor vessel;
   (c) a basket support tray comprising a horizontal plate peripherally attached to the wall of the reactor vessel and spaced below said splash plate, having a plurality of evenly spaced basket openings and a concentric vapor opening;
   (d) a cylindrical weir located upon the upper surface of said basket support tray and attached thereto in a manner such that reaction charge liquid which may accumulate upon the upper surface of said basket support tray is prevented from entering the vapor opening in said basket support tray, and in spacial separation from the bottom of said splash plate sufficient to allow passage therebetween of the reaction charge mixture vapor component at substantially no pressure drop;
   (e) a plurality of hollow cylindrical baskets open at the top and closed at the bottom having foraminous walls which baskets extend through the plurality of basket openings in said basket support tray in such manner that the tops of such baskets are about even with the upper surface of the basket support tray and the major portion of the baskets extend vertically below said basket support tray;
   (f) a reaction charge distributor tray, peripherally attached to the wall of said reactor vessel above said catalyst zone and spaced below the bottom of said baskets, comprising a horizontal plate having a plurality of evenly spaced openings through the surface of said distributor tray; and
   (g) a plurality of distributor caps upon the upper surface of said distributor tray covering the openings in said distributor tray, each distributor cap comprising a hollow cylindrical member having a V-notch with a small end at the lower edge of said cylindrical member and a base near the upper edge of said cylindrical member, and a distributor cap plate covering the upper opening in said hollow cylindrical member.

2. The reactor of Claim 1 including:
   (a) the splash plate comprising a conical member of substantially the same diameter as the inlet nozzle having an upwardly facing apex;
   (b) spacing members connected to the inlet nozzle and to the splash plate for maintaining the vertical, concentric spacial relationship between said inlet nozzle and said splash plate, and (c) a basket support tray having a concentric vapor opening of about the same diameter as said splash plate.

3. The reactor of Claim 2 wherein the vertical, cylindrical weir upon the surface of said basket support tray has a height of from about 3 to about 5 inches, and wherein said weir has a diameter substantially equal to the diameter of said splash plate such that liquid disengaging from said splash plate does not enter the vapor opening in said basket support tray encompassed by the cylindrical weir.

4. The reactor of Claim 3 wherein the hollow cylindrical member of each distributor cap defines two or more V-notches; and wherein the openings in the reaction charge distributor tray have a diameter of from about 2 inches to about 6 inches.

5. In a down flow reactor comprising a vertical vessel having a top inlet, a catalyst zone and a bottom outlet wherein vapor and liquid components of a reaction charge mixture are evenly distributed across the horizontal cross-section of the catalyst zone; an improved reaction charge flow distribution means comprising:

(a) a cylindrical inlet nozzle concentric with the vertical axis of said reactor vessel and extending through the vessel inlet for conveying a two-phase vapor-liquid reaction charge mixture into said reactor vessel;

(b) a splash plate comprising a conical member of substantially the same diameter as said inlet nozzle having an upwardly facing apex, spaced below and in vertical, concentric alignment with said inlet nozzle;

(c) spacing members connected to said inlet nozzle and to said splash plate for maintaining the vertical, concentric spacial relationship between said inlet nozzle and said splash plate;

(d) a basket support tray comprising a horizontal plate peripherally attached to the wall the reactor vessel and spaced below said splash plate, having a plurality of evenly spaced basket openings and a concentric vapor opening of substantially the same diameter as said splash plate;

(e) a cylindrical weir having a height of about 3 to 5 inches located upon the upper surface of said basket support tray and attached thereto in a manner such that reaction charge liquid which may accumulate upon the upper surface of said basket support tray is prevented from entering the vapor opening in said basket support tray, and in vertical spacial separation from the bottom of said splash plate sufficient to allow passage therebetween of the reaction charge mixture vapor component at substantially no pressure drop;

(f) a plurality of hollow cylindrical baskets open at the top and closed at the bottom having foraminous walls, which baskets extend through the plurality of baskets openings in said basket support tray in such manner that the tops of such baskets are about even with the upper surface of the basket support tray and the major portion of the baskets extend vertically below said basket support tray;

(g) a reaction charge distributor tray, peripherally attached to the wall of said reactor vessel below said baskets and above said reactor vessel catalyst zone, comprising a horizontal plate having a plurality of evenly spaced openings; and (h) a plurality of distributor caps upon the upper surface of said distributor tray covering the openings in said distributor tray, each distributor cap comprising a hollow cylindrical member having a V-notch with a small end at the lower edge of said cylindrical member, and a distributor cap plate covering the upper opening in said hollow cylindrical member.

References Cited
UNITED STATES PATENTS

| | | | |
|---|---|---|---|
| 3,607,000 | 9/1971 | Beal et al. | 23—288 R |
| 3,353,924 | 11/1967 | Riopelle | 23—288 R |
| 3,146,189 | 8/1964 | Kunreuther et al. | 208—146 |
| 3,112,256 | 11/1963 | Young et al. | 23—288 R |

JAMES H. TAYMAN, JR., Primary Examiner

U.S. Cl. X.R.

23—284; 208—146; 261—114 R